US009164806B2

(12) United States Patent
Oliver et al.

(10) Patent No.: US 9,164,806 B2
(45) Date of Patent: Oct. 20, 2015

(54) PROCESSING PATTERN FRAMEWORK FOR DISPATCHING AND EXECUTING TASKS IN A DISTRIBUTED COMPUTING GRID

(75) Inventors: Brian Oliver, Acton, MA (US); Christer Fahlgren, San Francisco, CA (US); Noah Arliss, Lexington, MA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 521 days.

(21) Appl. No.: 13/359,391

(22) Filed: Jan. 26, 2012

(65) Prior Publication Data

US 2012/0197959 A1    Aug. 2, 2012

Related U.S. Application Data

(60) Provisional application No. 61/437,554, filed on Jan. 28, 2011.

(51) Int. Cl.
*G06F 15/173* (2006.01)
*G06F 9/50* (2006.01)

(52) U.S. Cl.
CPC ............ *G06F 9/5038* (2013.01); *G06F 9/5027* (2013.01)

(58) Field of Classification Search
USPC ........................................................ 709/227
See application file for complete search history.

(56) References Cited

U.S. PATENT DOCUMENTS

| 5,784,569 | A | 7/1998 | Miller et al. |
|---|---|---|---|
| 5,819,272 | A | 10/1998 | Benson |
| 5,940,367 | A | 8/1999 | Antonov |
| 5,991,894 | A | 11/1999 | Lee et al. |
| 5,999,712 | A | 12/1999 | Moiin et al. |
| 6,182,139 | B1 * | 1/2001 | Brendel .................. 709/226 |
| 6,377,993 | B1 * | 4/2002 | Brandt et al. ................ 709/227 |
| 6,487,622 | B1 | 11/2002 | Coskrey, IV et al. |
| 6,490,620 | B1 * | 12/2002 | Ditmer et al. ................ 709/224 |
| 6,615,258 | B1 * | 9/2003 | Barry et al. .................. 709/223 |
| 6,631,402 | B1 * | 10/2003 | Devine et al. ................ 709/217 |
| 6,693,874 | B1 | 2/2004 | Shaffer et al. |
| 6,714,979 | B1 * | 3/2004 | Brandt et al. ................ 709/225 |
| 6,968,571 | B2 * | 11/2005 | Devine et al. ................... 726/11 |
| 7,114,083 | B2 * | 9/2006 | Devine et al. ................ 713/152 |
| 7,139,925 | B2 | 11/2006 | Dinker et al. |
| 7,266,822 | B1 * | 9/2007 | Boudnik et al. .............. 718/100 |
| 7,328,237 | B1 * | 2/2008 | Thubert et al. ................ 709/203 |
| 7,376,953 | B2 * | 5/2008 | Togasaki ..................... 718/105 |
| 7,464,378 | B1 | 12/2008 | Limaye |
| 7,543,046 | B1 | 6/2009 | Bae et al. |
| 7,698,390 | B1 | 4/2010 | Harkness |
| 7,720,971 | B2 * | 5/2010 | Moutafov ..................... 709/226 |

(Continued)

*Primary Examiner* — Alicia Baturay
(74) *Attorney, Agent, or Firm* — Tucker Ellis LLP

(57) ABSTRACT

A processing pattern is described for dispatching and executing tasks in a distributed computing grid, such as a cluster network. The grid includes a plurality of computer nodes that store a set of data and perform operations on that data. The grid provides an interface that allows clients to submit tasks to the cluster for processing. The interface can be used to establish a session between the client and the cluster, which will be used to submit a task for processing by the plurality of computer nodes of the cluster. A dispatcher receives a submission of the task over the interface and routes the task to at least one node in the cluster that is designated to process the task. A task processor then processes the task on the designated node(s), generates a submission outcome and indicates to the client that the submission outcome is available.

20 Claims, 6 Drawing Sheets

(56) References Cited

U.S. PATENT DOCUMENTS

| | | |
|---|---|---|
| 7,739,677 B1 | 6/2010 | Kekre et al. |
| 7,792,977 B1 | 9/2010 | Brower et al. |
| 7,814,248 B2 | 10/2010 | Fong et al. |
| 7,953,861 B2* | 5/2011 | Yardley .................. 709/227 |
| 8,195,835 B2 | 6/2012 | Ansari |
| 8,209,307 B2* | 6/2012 | Erofeev .................. 707/704 |
| 8,312,439 B2* | 11/2012 | Kielstra et al. ............. 717/148 |
| 2002/0035559 A1 | 3/2002 | Crowe et al. |
| 2002/0073223 A1 | 6/2002 | Darnell |
| 2002/0078312 A1 | 6/2002 | Wang-Knop et al. |
| 2003/0023898 A1 | 1/2003 | Jacobs |
| 2003/0046286 A1 | 3/2003 | Jacobs |
| 2003/0120715 A1 | 6/2003 | Johnson et al. |
| 2003/0187927 A1 | 10/2003 | Winchell |
| 2003/0191795 A1* | 10/2003 | Bernardin et al. ............ 709/105 |
| 2004/0059805 A1 | 3/2004 | Dinker et al. |
| 2004/0179471 A1 | 9/2004 | Mekkittikul et al. |
| 2004/0205148 A1 | 10/2004 | Bae |
| 2004/0267897 A1 | 12/2004 | Hill et al. |
| 2005/0021737 A1 | 1/2005 | Ellison et al. |
| 2005/0083834 A1 | 4/2005 | Dunagan et al. |
| 2005/0097185 A1* | 5/2005 | Gibson et al. ............... 709/217 |
| 2005/0138460 A1 | 6/2005 | McCain |
| 2005/0193056 A1 | 9/2005 | Schaefer |
| 2006/0095573 A1 | 5/2006 | Carle |
| 2007/0016822 A1 | 1/2007 | Rao et al. |
| 2007/0118693 A1* | 5/2007 | Brannon et al. .............. 711/118 |
| 2007/0140110 A1 | 6/2007 | Kaler |
| 2007/0174160 A1 | 7/2007 | Solberg |
| 2007/0237072 A1 | 10/2007 | Scholl |
| 2007/0260714 A1 | 11/2007 | Kalmuk |
| 2007/0271584 A1* | 11/2007 | Anderson et al. ............... 725/86 |
| 2008/0183876 A1 | 7/2008 | Duvur et al. |
| 2008/0276231 A1 | 11/2008 | Huang et al. |
| 2008/0281959 A1 | 11/2008 | Robertson |
| 2009/0265449 A1 | 10/2009 | Krishnappa et al. |
| 2009/0320005 A1 | 12/2009 | Toub et al. |
| 2010/0128732 A1 | 5/2010 | Jiang |
| 2010/0211931 A1 | 8/2010 | Levanoni |
| 2010/0312861 A1 | 12/2010 | Kolhi et al. |
| 2011/0041006 A1 | 2/2011 | Fowler |
| 2011/0107135 A1 | 5/2011 | Andrews et al. |
| 2011/0161289 A1 | 6/2011 | Pei |
| 2011/0179231 A1 | 7/2011 | Roush |
| 2011/0249552 A1 | 10/2011 | Stokes et al. |
| 2012/0117157 A1 | 5/2012 | Ristock |
| 2012/0158650 A1 | 6/2012 | Andre |
| 2012/0215740 A1 | 8/2012 | Vaillant |

* cited by examiner

```
package com.oracle.coherence.examples.incubator.processing.task;
import java.util.concurrent.ExecutionException;
import com.oracle.coherence.common.identifiers.StringBasedIdentifier;
import com.oracle.coherence.patterns.processing.ProcessingSession;
import com.oracle.coherence.patterns.processing.ProcessingSessionFactory;
import com.oracle.coherence.patterns.processing.SubmissionOutcome;
import com.oracle.coherence.patterns.processing.internal.DefaultSubmissionConfiguration;
import com.oracle.coherence.patterns.processing.internal.task.LocalExecutorList.ExecutorAlreadyExistsException;
import com.tangosol.net.CacheFactory;

public class PiCalculationSample
  {
  public void executeTask()
      throws InterruptedException,
      ExecutionException, ExecutorAlreadyExistsException
    {
    System.out.println("Testing PI calculation");
    ProcessingSession session = new DefaultProcessingSession(StringBasedIdentifier
       .newInstance("PICalculationSample " + DateFormat.getDateTimeInstance().format(System.currentTimeMillis())));

SubmissionOutcome pioutcome = session.submit(new CalculatePITask(100000), new DefaultSubmissionConfiguration());

System.out.println("PI (100000) iterations is :"+ pioutcome.get().toString());

factory.shutdown();
    CacheFactory.shutdown();
    }
  public static void main(String[] args)
    {
    PiCalculationSample sample = new PiCalculationSample();
    try
      {
      sample.executeTask();
      }
    catch (Exception e)
      {
      e.printStackTrace();
      }
    }
  }
```

FIGURE 5

PROCESSING PATTERN FRAMEWORK FOR DISPATCHING AND EXECUTING TASKS IN A DISTRIBUTED COMPUTING GRID

CLAIM OF PRIORITY

The present application claims the benefit of U.S. Provisional Patent Application No. 61/437,554, entitled "INCUBATOR WITH PROCESSING PATTERNS FOR A DISTRIBUTED DATA GRID," by Noah Arliss et al., filed on Jan. 28, 2011, which is incorporated herein by reference in its entirety.

CROSS REFERENCE TO RELATED APPLICATIONS

This patent application is related to the following U.S. patent applications, each of which is incorporated by reference herein in its entirety:

U.S. Provisional Patent Application No. 61/437,521 entitled "IN-MEMORY DATA GRID FOR MANAGING AND CACHING DATA USED BY APPLICATIONS" by Christer Fahlgren et al., filed on Jan. 28, 2011;

U.S. patent application Ser. No. 13/359,375 entitled "TRANSACTION CACHE VERSIONING AND STORAGE IN A DISTRIBUTED DATA GRID" by Tom Beerbower et al., filed on Jan. 26, 2012;

U.S. Provisional Patent Application No. 61/437,536 entitled "QUERY LANGUAGE FOR ACCESSING DATA STORED IN A DISTRIBUTED IN-MEMORY DATA GRID" by David Leibs et al., filed on Jan. 28, 2011;

U.S. Provisional Patent Application No. 61/437,541 entitled "SECURITY FOR A DISTRIBUTED IN-MEMORY DATA GRID" by David Guy et al., filed on Jan. 28, 2011;

U.S. patent application Ser. No. 13/352,195 entitled "SYSTEM AND METHOD FOR USE WITH A DATA GRID CLUSTER TO SUPPORT DEATH DETECTION" by Mark Falco et al., filed on Jan. 17, 2012;

U.S. patent application Ser. No. 13/352,203 entitled "SYSTEM AND METHOD FOR USING CLUSTER LEVEL QUORUM TO PREVENT SPLIT BRAIN SCENARIO IN A DATA GRID CLUSTER" by Robert H. Lee et al., filed on Jan. 17, 2012;

U.S. patent application Ser. No. 13/352,209 entitled "SYSTEM AND METHOD FOR SUPPORTING SERVICE LEVEL QUORUM IN A DATA GRID CLUSTER" by Robert H. Lee et al., filed on Jan. 17, 2012; and U.S. patent application Ser. No. 13/360,487 entitled "PUSH REPLICATION FOR USE WITH A DISTRIBUTED DATA GRID" by Brian Oliver et al., filed on Jan. 27, 2012.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates to processing and executing of tasks and other work within a distributed computing environment.

BACKGROUND

In recent years, distributed computing and distributed algorithms have become prevalent in a wide variety of contexts, for reasons of increased performance and load capacity, high availability and failover and faster access to data. Distributed computing typically involves a number of autonomous computers (also called nodes) in communication with one another to solve a task, such as execute an application, solve complex computational problems or provide users access to various services. Each of the computer nodes typically includes its own processor(s), memory and a communication link to other nodes. The computers can be located within a particular location (e.g. cluster network) or can be connected over a large area network (LAN) such as the Internet. In most cases, distributed computers use messages to communicate with one another and to coordinate task processing and data management.

The management of tasks and other work across the cluster can be a significant concern as the processing load often needs to be distributed or apportioned among the members of the cluster in an efficient manner that does not overload any particular node. Allowing each developer or client application to individually determine where requests should go and how they should be processed can be problematic and can create inconsistencies across the grid when various individuals invoke functions in a disorganized way. Furthermore, software programmers may be unnecessarily forced to learn the complexities and internal configurations of the computing grid before they can apply some cohesion to the distribution of work across the nodes.

In light of the foregoing, what is needed is a more simplified yet efficient framework for the processing of tasks and other work across the cluster or grid. It is desirable that this framework be generalized and transparent to clients in terms of the underlying architecture that will manage the processing load. It is further desirable that the processing of the actual work be managed behind the scenes in an efficient and distributed manner, avoiding single points of failure, latencies and any other problems that may arise in this context. Applicants have identified these as well as numerous other needs in coming to conceive the subject matter of the present application.

BRIEF SUMMARY

In accordance with various embodiments of the invention, a processing pattern is described for dispatching and executing tasks in a distributed computing grid, such as a cluster network. The grid includes a plurality of computer nodes that store a set of data and perform operations on that data. The grid provides an interface that allows clients to submit tasks to the cluster for processing. The interface can be used to establish a session between the client and the cluster, which will be used to submit a task for processing by the plurality of computer nodes of the cluster. A dispatcher receives a submission of the task over the interface and routes the task to at least one node in the cluster that is designated to process the task. A task processor then processes the task on the designated node(s), generates a submission outcome and indicates to the client that the submission outcome is available.

BRIEF DESCRIPTION OF THE DRAWINGS

FIG. 5 is an illustration of an example of the processing pattern in accordance with various embodiments of the invention.

DETAILED DESCRIPTION

Figure 1:
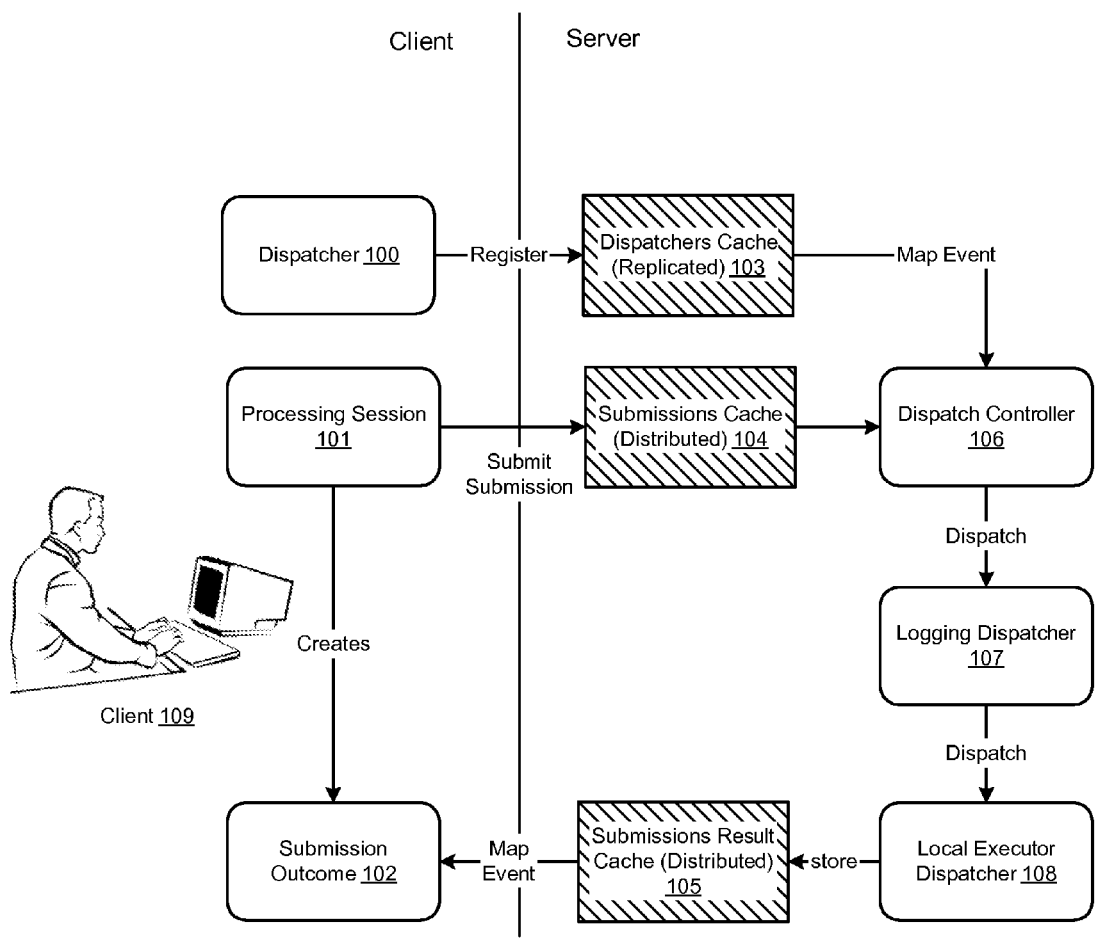
FIG. 1 is an illustration of the processing pattern framework in accordance with various embodiments of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

In accordance with various embodiments, a processing pattern framework is described for computers that store data in an in-memory computing grid. In accordance with an embodiment, the grid is a system composed of multiple servers that work together to manage information and related operations—such as computations—in a distributed environment (e.g. a cluster network). The grid stores the information in memory to achieve higher performance and uses redundancy by keeping copies of that information synchronized across multiple servers to ensure resiliency of the system and the availability of the data in the event of server failure. The grid can be used as a data management system for application objects that are shared across multiple servers, require low response time, high throughput, predictable scalability, continuous availability and information reliability. As a result of these capabilities, the computing grid is ideally suited for use in computational intensive, stateful middle-tier applications. The data management is targeted to run in the application tier, and is often run in-process with the application itself, for example in the application server cluster. In accordance with an embodiment, the compute grid software is middleware that reliably manages data objects in memory across a plurality of servers and also brokers the supply and demand of data between applications and data sources. In addition, the grid can push the processing of requests closer to the data residing in the cluster. Rather than pulling the necessary information to the server that will be executing the process, the data grid can push the processing of the request to the server that is storing the information locally. This can greatly reduce latency and improve data access speeds for applications.

In accordance with an embodiment, an incubator containing several patterns or frameworks can be provided to the computing grid. The incubator is a repository of projects and patterns that can be added to an application, to enable that application to function optimally in the distributed computing grid. In particular, the incubator projects can provide example implementations for commonly used design patterns, system integration solutions, distributed computing concepts and other artifacts that are designed to enable rapid delivery of solutions to address a particular functionality.

In accordance with an embodiment, the incubator includes a set of pre-compiled Java Archive Files (JARs), as well as full source distributions which can be further modified and customized. Each project in the incubator is a specific pattern that solves a unique use case, using an optimal means of addressing said use case. These projects form a stack of functionality that can be used together or independently as needed by a client of the computing grid. By using these projects and patterns, an application developer is able to draw upon known best practices when building their applications.

One framework included in the incubator can be a processing pattern framework that provides a compute grid Application Programming Interface (API) for a client application, allowing it to leverage computing resources within the cluster and externally. The processing pattern provides a simple and extensible framework for the processing of work across the grid. As illustrated, a number of options are available for using the processing pattern. The work can be executed inside the data grid cluster, as well as code running on an extended client over a remote connection to the grid. From the perspective of the client, work is submitted asynchronously to the grid, and work is immediately returned to the client in the form of a submission outcome. The submission outcome is a future to which an event handler can be registered to fire when the result is returned or to which the client can actively wait for the result. Once work is submitted to the grid, it is routed to an appropriate task processor for execution and when completed, the result is returned and the client is notified of the submission outcome.

In accordance with an embodiment, the API provided by the processing pattern allows clients of the cluster to submit tasks to the cluster for processing. This interface can be used to establish a session between the client and the cluster, which will be used to submit a task for processing by the various cluster nodes. A dispatcher receives a submission of the task over the interface and routes the task to at least one node in the cluster that is designated to process the task. A task processor then processes the task on the designated node(s), generates a submission outcome and indicates to the client that the submission outcome is available.

FIG. 1 is an illustration of the processing pattern framework in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As shown in the illustrated embodiment, a processing session 101 can be used to submit work to the cluster for asynchronous processing. In accordance with an embodiment, the session is associated with a unique identifier that can be used to reconnect to the session in cases where the client loses the connection due to failure or restart. Similarly, one client may submit work to the session, and another client may retrieve the results of the submission. The submission can also be canceled by the client entirely, allowing the grid to be freed up from long running complex computational work.

The work submitted to the session can include an object, task, request or any other payload that will need to be executed by the nodes in the grid. A client consumer registers itself with a session 101, which serves as an entry point for submitting work to the cluster. Once the session accepts a submission of a task from the client 109, the processing framework will ensure that the task is processed by the grid and a submission outcome 102 is returned. As such, the client is effectively shielded from the underlying complexities of the compute grid and can simply use the session to submit work and be signaled when the outcome is available.

In accordance with an embodiment, the client can configure or register dispatchers 100 to dispatch the task(s). Once registered, the dispatchers are stored in a dispatchers cache 103. In accordance with an embodiment, the dispatch controller 106 will route the task submissions to their appropriate dispatchers in the registered order of the dispatchers.

In accordance with an embodiment, when a client submits a submission of work to the processing session, the submission is placed in a submissions cache 104 on the grid. This can trigger a dispatch by the dispatch controller 106. The dispatch can be triggered by a backing map event on the primary node. Once initiated, the dispatch controller 106 can dispatch the submission of the work to each registered dispatcher 107, 108 until one dispatcher accepts the submission. When a dispatcher has accepted the submission, a submission outcome 102 is returned to the client. Subsequently, when the dispatcher (or in the case of task dispatching, the task processor) has processed the submission, the submission outcome is signaled and the result is available to the client.

In accordance with an embodiment, many dispatchers may be configured to enable specific processing of different types of submissions. Dispatchers are consulted in a configuration order for each submission to determine suitability for processing or routing. Once a dispatcher has accepted a submission, it can be solely responsible for creating a submission outcome.

In accordance with an embodiment, there can be at least three different types of dispatcher implementations, including a logging dispatcher that logs the submissions into a log file, a Java dispatcher that executes Java "Runnables" and Java "Callables" interfaces, and a default dispatcher that dispatches tasks to task processor implementations. Additionally, custom dispatcher that allows user-implemented logic can be provided in the data grid.

In accordance with an embodiment, a task is a formalized unit of work that is a specialized class of a submission. Alternatively, a submission can include other types of work that do not necessarily implement the "task" interface. In accordance with an embodiment, a task can be a resumable task. Resumable tasks are tasks that can be suspended for a period of time and later resume execution.

In accordance with an embodiment, a task is executed by a task processor that can be customized to perform a particular set of computations or functions. Because the processing pattern is a framework, the actual task processor can be coded by the developer utilizing the framework and the framework can ensure that the task processor is optimally executed on the appropriate node or set of nodes in the cluster and the results of the execution returned to the client. Thus, any custom task processor can take advantage of the processing pattern framework and leverage the capacity of the computing grid. In accordance with an embodiment, there are at least two types of task processors. A grid type task processor is instantiated automatically on each grid node. A single type task processor is instantiated only on the particular node where it is configured. The single type task processor can be instantiated on multiple nodes, however, it would need to be configured to be started on each of those nodes.

In accordance with an embodiment, tasks are mapped to task processors using task dispatch policies. These policies can include but are not limited to round robin, random and attribute matching. The attribute matching enables an attribute supplied with a submission to match against an attribute supplied with a task processor definition.

Figure 2:
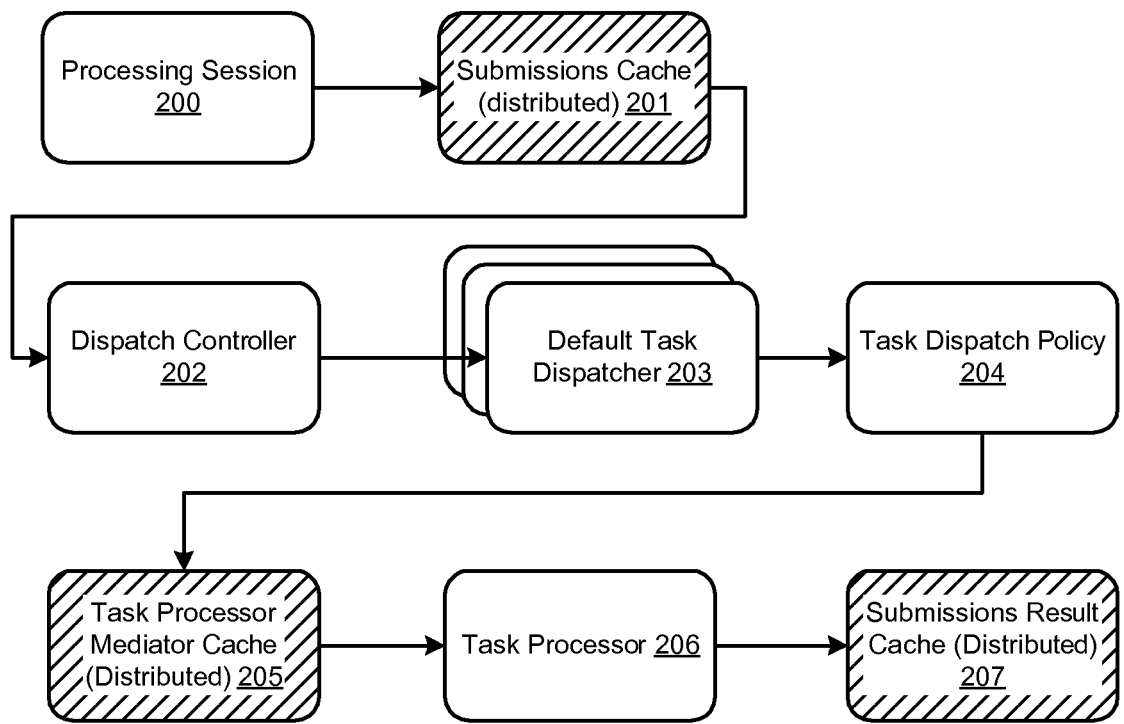
FIG. 2 is an illustration of the structure of task execution, in accordance with various embodiments of the invention.

FIG. 2 is an illustration of the structure of task execution, in accordance with various embodiments of the invention. Similarly to the other figures in this disclosure, this diagram depicts components as logically separate, however, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As shown in the illustrated embodiment, the task is first submitted to a processing session 200. Thereafter, the submission of the task is placed in a submissions cache 201 which can be distributed on the cluster. Once the task has been placed in the submissions cache, a backing map event can trigger a dispatch controller 202 to dispatch the task. The dispatch controller can dispatch the task to a chain of registered task dispatchers, such as the task dispatcher 203. The chain of dispatchers can employ the task dispatch policy 204 to route the task to the task processor mediator cache 205 that is distributed across the grid. The task is thereafter relayed to the task processor 206 which can perform a set of functions and return a submissions result to the submissions result cache 207.

In accordance with an embodiment, the task dispatch policies can be configured to include attribute matching (in addition to Round Robin and Random). The system can provide the ability to supply attributes with a submission, which can be matched with attributes for the task processor, in order to allow for fine grained control of the amount of resources available for particular types of jobs. For example, the system can choose to use only the task processors that include matching attributes for processing a submission supplied with particular attributes.

Figure 3:
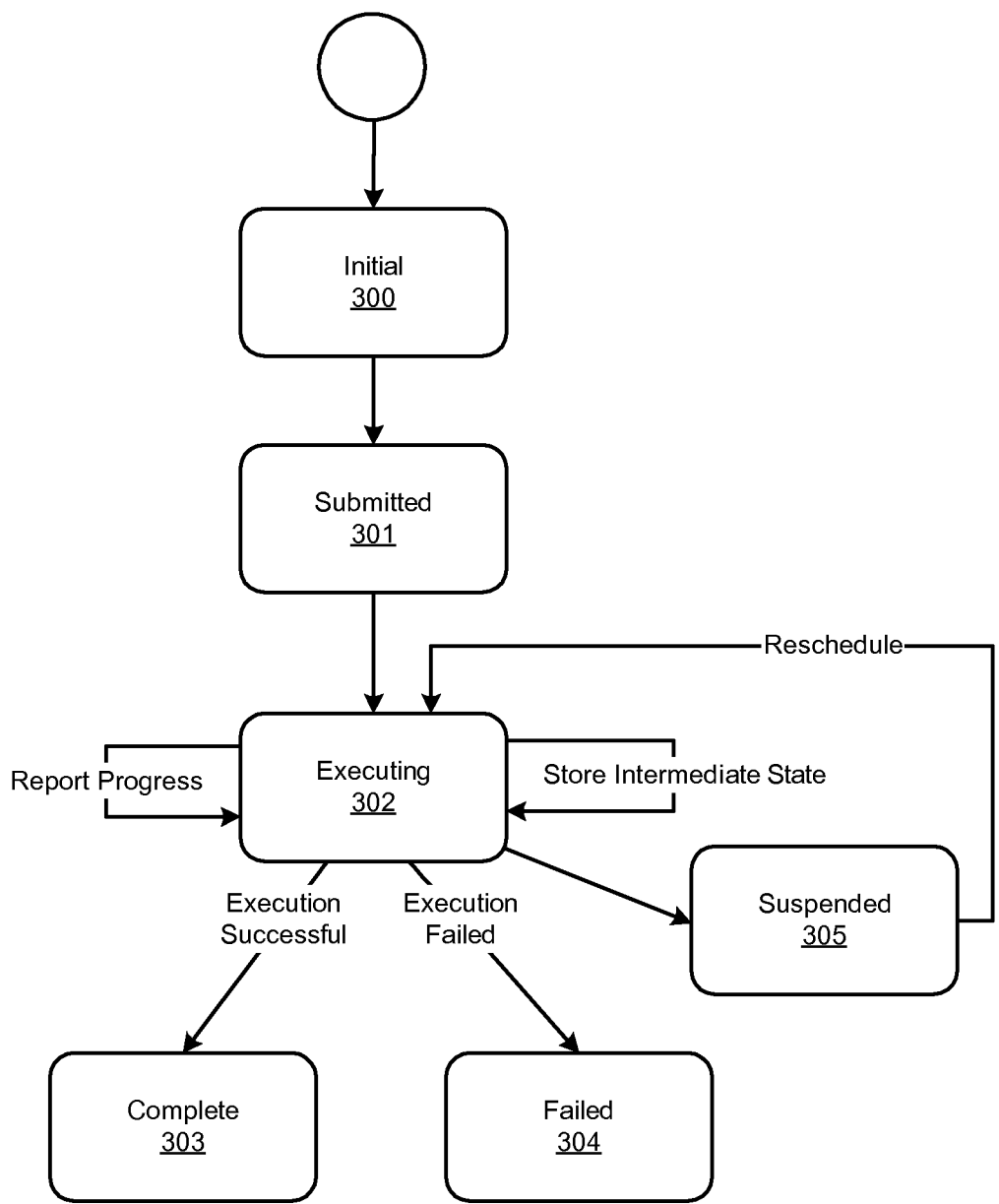
FIG. 3 is a state diagram of the various states of a resumable task, in accordance with various embodiments of the invention.

FIG. 3 is a state diagram of the various states of a resumable task, in accordance with various embodiments of the invention. It should be noted that the states illustrated in this diagram are shown for purposes of illustration and are not necessarily limited to this particular set of states. In alternative embodiments, the task can include additional states, or may exclude some of the states illustrated here.

As shown in the illustrated embodiment, once the task is created, it is in its initial state 300. When the client submits the task to the processing session, the task reaches a submitted state 301. Once, the task is scheduled for execution, the task enters an executing state 302. In this state, the task stores intermediate state such that it can be suspended 305 and later resumed to continue execution. Furthermore, the task can report on its progress when it is in the executing state. For example, when a resumable task executes, the execution environment is available to support checkpointing, progress reporting and determination of resumption. In accordance with an embodiment, the resumable task can return a special yield object to suspend execution. The yield object can indicate to the client that the task has been suspended, having saved a checkpoint intermediate state and will be resumed later.

If the task fails, it can enter a failed state 304. Alternatively, if the execution of the task is successful, it can enter a finished or complete state 303.

Figure 4:
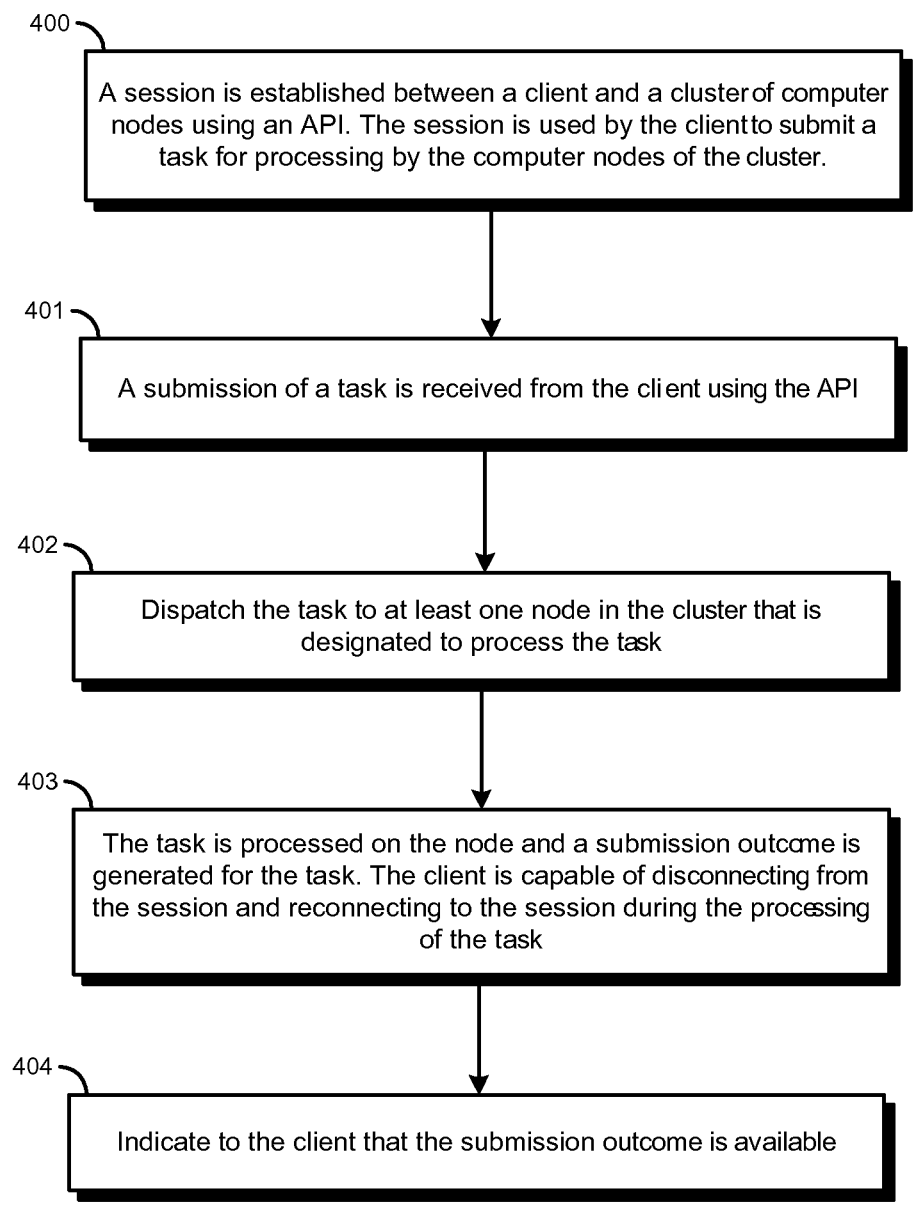
FIG. 4 is a flow chart illustration of a process for using the processing pattern framework to dispatch and execute tasks, in accordance with various embodiments of the invention.

FIG. 4 is a flow chart illustration of a process for using the processing pattern framework to dispatch and execute tasks, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 400, a client can establish a session with the cluster by using the API. The session will be used by the client to submit a task for processing by the computer nodes of the cluster. In step 401, the session receives a submission of a task (or other work) from the client on the API. The task is then dispatched to at least one node in the cluster that is designated to process the task, as shown in step 402. In step 403, the task can be processed on the designated node and a submission outcome is generated for the task. During the process, the client is capable of disconnecting from the session and reconnecting to the session. In this manner, losing the connection does not cause the client to have to resubmit the work and begin anew. In step 404, the framework will indicate to the client that the submission outcome is available.

FIG. 5 is an illustration of an example of the processing pattern in accordance with various embodiments of the invention. It should be noted that the code here is being provided purely as an example and is not intended to limit the embodiments of the invention to the particular implementation illustrated here. It will be understood by one of ordinary skill in the art that other programming languages and/or implementations are possible within the scope of the present invention.

The code illustrated here is a simple example of using the processing pattern to perform a pi calculation. As shown, a "PiCalculationSample" class is defined, having a method called "executeTask." The method gets the processing session and makes it uniquely identifiable by using the system current time. Making the session identifiable in such a manner allows the client to disconnect and reconnect to it while the work is being performed. The method then submits to the session a task entitled "CalculatePITask" (task processor) that will perform the algorithm to calculate pi for 100,000 iterations. In addition, state can be associated with the task ("DefaultSubmissionConfiguration") that will be used by the dispatcher to route the task to a particular executing node. The dispatcher can match this metadata associated with the task with the metadata supplied with the task processor. In this particular example.

As further illustrated, when the method is called, the pi calculation task is submitted to the processing pattern. The processing pattern will take the task on any node within the computing grid. On each node resides a dispatcher (or a set of dispatchers). This dispatcher will route the task to a particular task processor which will calculate pi for 100,000 iterations and return the result (submission outcome). The client can wait for the result, can periodically ping for the result, or can register an event handler to be informed when the result arrives.

Figure 6:
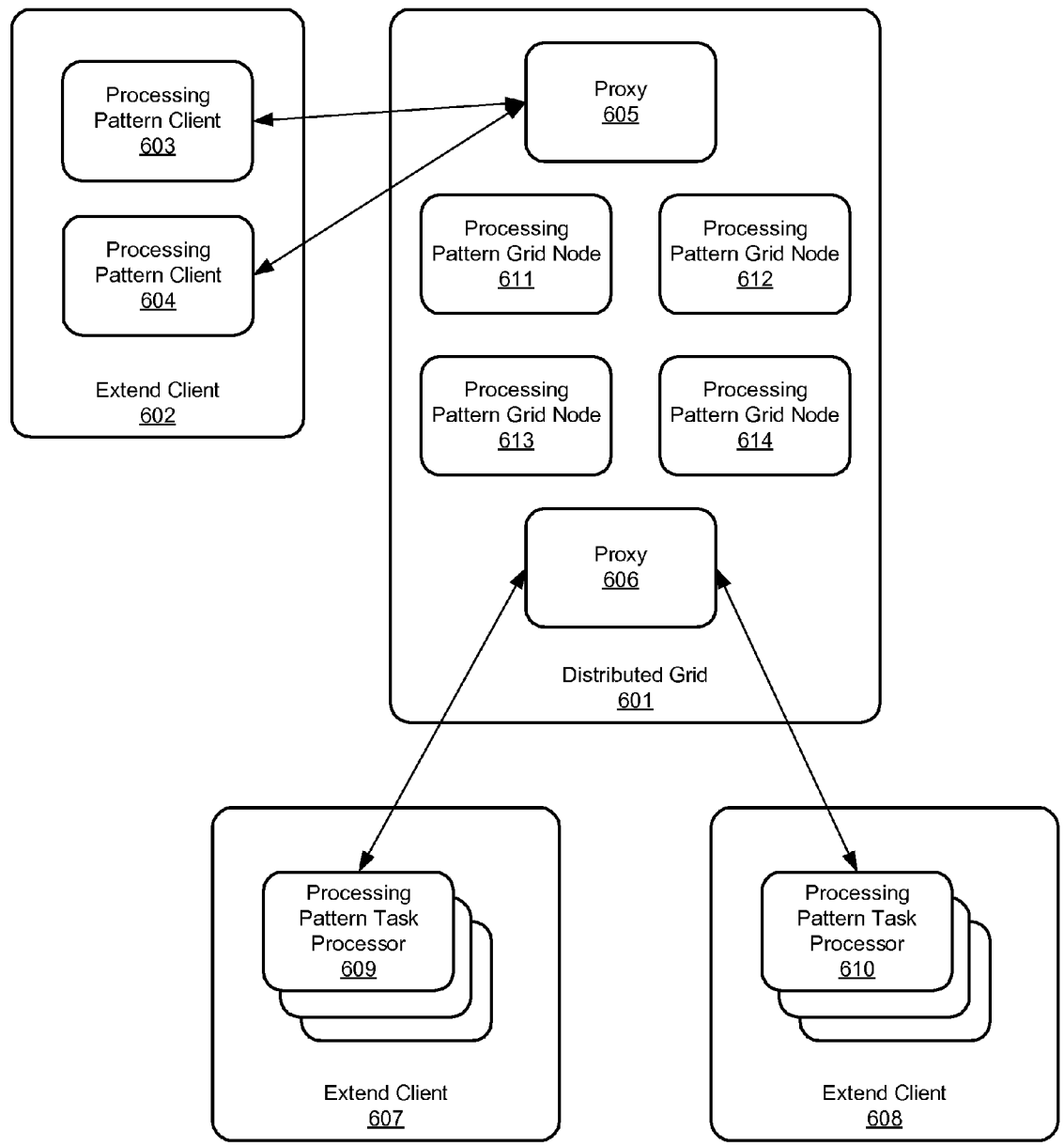
FIG. 6 is an illustration of the processing pattern topology, in accordance with various embodiments of the invention.

FIG. 6 is an illustration of the processing pattern topology, in accordance with various embodiments of the invention. The processing pattern provides a simple and extensible framework for the processing of work across the data grid cluster 601 with a plurality of processing pattern grid nodes 611-614. This extensible framework can further include one or more extend clients that can communicate with the data grid cluster, e.g. one or more Coherence*Extend-TCP clients. As illustrated, a processing pattern client 603 or 604 on an extend client 602 can submit a request via a proxy 605 in the data grid cluster. A number of options are available for using the processing pattern. The work can be executed inside the data grid cluster, as well as code running on an extend client 607 and/or 608 with one or more processing pattern task processors 609 and/or 610.

In accordance with an embodiment, works can be submitted asynchronously to the grid. The results can be returned to the client and monitored through submission outcome, which is a future interface. The client can actively wait for the result, and/or an event handler can be registered to fire another event when the result is returned. Once work is submitted to the grid, it can be routed to an appropriate work processor for execution and when completed, the result is returned and the client is notified of the submission outcome. For example, the system can take advantage of available computing resources outside the data grid cluster, by routing the work to an idle user computer that connects to the grid.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. The transmission may include a plurality of separate transmissions. In accordance with certain embodiments, however, the computer storage medium containing the instructions is non-transitory (i.e. not in the process of being transmitted) but rather is persisted on a physical device.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A system for dispatching and executing tasks in a distributed computing environment, said system comprising:
 a computer including memory and one or more microprocessors;
 a cluster including a plurality of computer nodes that store a set of data and perform operations on said data, said cluster providing an application programming interface (API) used to submit tasks to the cluster;
 a session established between a client and the cluster using said API, said session adapted to be used by said client to submit a task for processing by the plurality of computer nodes of the cluster;
 a dispatch controller configured to dispatch a submission of a task to a plurality of dispatchers registered in a particular order, wherein the dispatchers include a logging dispatcher for logging the task submission, an executor dispatcher for executing one or more interfaces to process the task, and a default task dispatcher for routing said task to a node designated to process said task in the cluster; and
 a task processor, on the node, that is selected for processing the routed task by matching an attribute supplied with the task processor and an attribute supplied with the task;
 wherein after the task is processed, an indication is made to said client that a submission outcome is available.

2. The system of claim 1, wherein the session includes an identifier used for reconnecting to the session after a connection between the client and the session has been terminated.

3. The system of claim 1, wherein the task stores an intermediate state used to suspend and resume the task.

4. The system of claim 1, wherein the logging dispatcher logs the task submission in a log file; and wherein the executor dispatcher executes a Java Runnable interface and a Java Callable interface.

5. The system of claim 1, further comprising:
 a submissions cache distributed on said cluster, wherein the submissions cache stores the task submission before said task submission is provided to the dispatch controller.

6. The system of claim 1, further comprising:
 a submissions result cache distributed on said cluster, wherein the submissions result cache stores the submission outcome before the submission outcome is provided to the client.

7. The system of claim 1, wherein the default task dispatcher is configured to dispatch said task to the task processor using at least one of a set of dispatch policies that includes a round robin dispatch policy and a random dispatch policy.

8. The system of claim 1, wherein the task is associated with a set of metadata that is used by the default task dispatcher to dispatch the task to the task processor.

9. The system of claim 1, further comprising:
 a plurality of task processors that are configured in a cache configuration file.

10. A method for dispatching and executing tasks in a distributed computing environment, said method comprising:
 establishing a session between a client and a cluster of computer nodes using an application programming interface (API) provided by the cluster, wherein the API and said session are adapted to be used by said client to submit a task for processing by the computer nodes of the cluster;
 receiving a submission of said task from the client;
 dispatching, via a dispatcher controller, the submission of said task to a plurality of dispatchers registered in a particular order, wherein the dispatchers include a logging dispatcher for logging the task submission, an executor dispatcher for executing an interface to process the task, and a default task dispatcher for routing said task to a task processor on a node designated to process said task in the cluster, wherein the task processor is selected by matching an attribute supplied with said task against an attribute supplied with a definition of the task processor; and
 indicating to the client that a submission outcome is available.

11. The method of claim 10, wherein the session includes an identifier used for reconnecting to said session after a connection between the client and the session has been terminated.

12. The method of claim 10, further comprising:
 storing an intermediate state for said task, wherein the intermediate state is used to suspend and resume said task.

13. The method of claim 10, wherein the logging dispatcher logs the task submission in a log file; and wherein the executor dispatcher executes a Java Runnable interface and a Java Callable interface.

14. The method of claim 10, further comprising:
 storing the task submission in a submissions cache distributed on said cluster before said task submission is provided to the dispatcher.

15. The method of claim 10, further comprising:
 storing the submission outcome in a submissions result cache distributed on said cluster before the submission outcome is provided to the client.

16. The method of claim 10, wherein the task dispatcher is configured to dispatch said task to the task processor using at least one of a set of dispatch policies that includes a round robin dispatch policy, and a random dispatch policy.

17. The method of claim 10, wherein the task is associated with a set of metadata that is used to dispatch the task to the task processor.

18. A non-transitory computer readable storage medium storing a set of instructions executed by one or more processors to perform a sequence of steps comprising:
 establishing a session between a client and a cluster of computer nodes using an application programming interface (API) provided by the cluster, wherein the API and said session are used by said client to submit a task for processing by the computer nodes of the cluster;
 receiving a submission of said task from the client;
 dispatching, via a dispatcher controller, the submission of said task to a plurality of dispatchers registered in a particular order, wherein the dispatchers include a logging dispatcher for logging the task submission, an executor dispatcher for executing an interface to process the task, and a default task dispatcher for routing said task to a task processor on a node designated to process said task in the cluster, wherein the task processor is selected by matching an attribute supplied with said task against an attribute supplied with a definition of the task processor; and indicating to the client that a submission outcome is available.

19. The system of claim 1, wherein the plurality of dispatchers are consulted in the particular order to determine whether the task submission should be processed or routed.

20. The method of claim 10, wherein the plurality of dispatchers are consulted in the particular order to determine whether the task submission should be processed or routed.

* * * * *